(12) United States Patent
Villegas et al.

(10) Patent No.: US 7,860,242 B2
(45) Date of Patent: Dec. 28, 2010

(54) METHOD OF SECURELY IMPLEMENTING A CRYPTOGRAPHY ALGORITHM OF THE RSA TYPE, AND A CORRESPONDING COMPONENT

(75) Inventors: Karine Villegas, Gemenos (FR); Marc Joye, Saint Zacharie (FR); Benoit Chevallier-Mames, Cassis (FR)

(73) Assignee: Gemalto SA, Meudon (FR)

( * ) Notice: Subject to any disclaimer, the term of this patent is extended or adjusted under 35 U.S.C. 154(b) by 269 days.

(21) Appl. No.: 12/071,571

(22) Filed: Feb. 22, 2008

(65) Prior Publication Data
US 2008/0144814 A1 Jun. 19, 2008

Related U.S. Application Data

(62) Division of application No. 10/566,504, filed on Jan. 31, 2006, now Pat. No. 7,359,508.

(30) Foreign Application Priority Data
Jul. 31, 2003 (FR) .................................. 03 09457

(51) Int. Cl.
*H04L 9/28* (2006.01)
(52) U.S. Cl. .......................................... 380/28; 380/30
(58) Field of Classification Search ............. 380/28–30, 380/255, 259, 277, 285, 44, 46; 708/492; 713/185, 172
See application file for complete search history.

(56) References Cited
U.S. PATENT DOCUMENTS

| | | | |
|---|---|---|---|
| 4,736,423 A | 4/1988 | Matyas | |
| 5,991,415 A | 11/1999 | Shamir | |
| 6,144,740 A | 11/2000 | Laih et al. | |
| 6,304,658 B1 * | 10/2001 | Kocher et al. ................. | 380/30 |
| 6,965,673 B1 | 11/2005 | Boneh et al. | |
| 2004/0215685 A1 | 10/2004 | Seifert et al. | |
| 2009/0110187 A1 * | 4/2009 | Fischer ........................ | 380/28 |

FOREIGN PATENT DOCUMENTS

| | | |
|---|---|---|
| FR | 2 830 146 | 3/2003 |
| WO | WO 99/49416 | 9/1999 |
| WO | WO 00/24155 | 4/2000 |
| WO | WO 01/55838 | 8/2007 |

OTHER PUBLICATIONS

C. Aumuller et al., "Fault Attacks on RSA with CRT: Concrete Results and Practical Countermeasures", Cryptographic Hardware and Embedded Systems, International Workshop, Aug. 13, 2000, pp. 260-275.

* cited by examiner

*Primary Examiner*—Nirav Patel
(74) *Attorney, Agent, or Firm*—Buchanan, Ingersoll & Rooney, PC

(57) ABSTRACT

A method for the secure application of a cryptographic algorithm of the RSA type in an electronic component obtains the value of a public exponent e from a given set of probable values, without a priori knowledge of that value. Having determined the value for the public exponent e, the application of countermeasures using the value of e, to block error attacks and side channel attacks, particularly of the DPA and SPA type, are carried out on the application of a private operation of the cryptographic algorithm.

15 Claims, No Drawings

METHOD OF SECURELY IMPLEMENTING A CRYPTOGRAPHY ALGORITHM OF THE RSA TYPE, AND A CORRESPONDING COMPONENT

CROSS-REFERENCE TO RELATED APPLICATIONS

The present application is a division of U.S. patent application Ser. No. 10/566,504 filed on Jan. 31, 2006, now U.S. Pat. No. 7,359,508, incorporated herein by reference, which claims foreign priority under 35 U.S.C. §119 to Application No. 03/09457, filed Jul. 31, 2003, all of which are incorporated herein by reference, the contents of which are hereby incorporated by reference.

The present invention relates to a method of securely implementing a cryptography algorithm in an electronic component, and more particularly to a method of securely implementing a cryptography algorithm of the Rivest-Shamir-Adleman (RSA) type.

The invention also relates to the corresponding electronic component.

Such components are, in particular used in applications in which access to services or to data is stringently controlled.

They have a "software" architecture, i.e. a programmable architecture, formed around a microprocessor and around memories, including a non-volatile memory of the Electrically Erasable Programmable Read-Only Memory (EEPROM) type which contains one or more secret numbers. The architecture is a non-specialist architecture suitable for executing any algorithm.

Such components are used in computer systems, on-board or otherwise. They are used, in particular, in smart cards, for certain applications thereof. For example, such uses are applications for access to certain databanks, banking applications, remote payment applications, e.g. for television purchases, for gasoline purchases, or for payment of highway tolls.

Such components or cards thus implement a cryptography algorithm for encrypting transmitted data and/or for decrypting received data, or for authenticating or digitally signing a message.

On the basis of such a message applied as input into the card by a host system (server, automatic teller machine, etc.) and on the basis of secret numbers contained in the card, the card returns the message as encrypted, authenticated, or signed to the host system, thereby enabling the host system to authenticate the component or the card, and to exchange data, etc.

The characteristics of the cryptography algorithm can be known: computations performed; parameters used. The only unknown quantity is the secret number(s). The entire security of such cryptography algorithms relies on that/those secret number(s) contained in the card and unknown to the world outside the card. The secret number(s) cannot be deduced merely by knowledge of the message applied as input and of the encrypted message delivered in return.

Unfortunately, it has appeared that external attacks based on physical magnitudes measurable from the outside of the component while said component is running the cryptography algorithm make it possible for ill-intentioned people to find the secret number(s) contained in the card. Such attacks are known as "side channel attacks". Among such side channel attacks, there are Single Power Analysis (SPA) attacks based on one measurement or a few measurements, and Differential Power Analysis (DPA) attacks based on statistical analyses resulting from many measurements. The principle of such side channel attacks is based, for example, on the fact that the current consumption of the microprocessor executing instructions varies as a function of the instruction or of the data being handled.

There also exists a type of attack known as a "fault attack". In that type of attack, the attacker injects any fault while the cryptography algorithm is being computed, with the aim of using the presence of the fault to extract secret information.

The fault can also come from a computation error due to the hardware implementing the cryptography algorithm. However, in both cases, it is considered that a fault attack has occurred.

The various types of attack are possible in particular with public-key cryptography algorithms such as, for example, the RSA algorithm (named after its authors Rivest, Shamir, and Adleman) which is the algorithm that is in most widespread use in this field of application, and to which the present invention is more particularly applicable.

The main characteristics of the RSA public-key cryptographic system are recalled briefly below.

The first public-key encryption and signature scheme was developed in 1977 by Rivest, Shamir, and Adleman, who invented the RSA cryptographic system. The security of RSA is based on the difficulty of factoring a large number that is the product of two prime numbers. That system is the most widely used public-key cryptographic system. It can be used as an encryption method or as a signature method.

The principle of the RSA cryptographic system is as follows. It consists firstly in generating the pair of RSA keys.

Thus, each user creates an RSA public key and a corresponding private key, using the following 5-step method:

1) Generate two distinct prime numbers p and q;
2) Compute $n=pq$ and $\Phi(n)=(p-1)(q-1)$, where $\Phi$ is called the Euler totient function or the Euler phi-function;
3) Select an integer e, $1<e<\Phi(n)$, such that $pgcd(e,\Phi(n))=1$, randomly or on the choice of the user who could thus choose e to be small such that $e=2^{16}+1$ or $e=3$ or $e=17$;
4) Compute the unique integer d, $1<d<\Phi(n)$, such that:

$$e \cdot d = 1 \text{ modulo } \Phi(n); \quad (1)$$

5) The public key is (n,e); the private key is d or (d,p,q).

The integers e and d are called respectively the "public exponent" and the "private exponent". The integer n is called the "RSA modulus".

Once the public and private parameters are defined, given x, with $0<x<n$, the public operation on x which can, for example, be the encryption of the message x, consists in computing:

$$y = x^e \text{ modulo } n \quad (2)$$

In which case, the corresponding private operation is the operation of decrypting the encrypted message y, and consists in computing:

$$Y^d \text{ modulo } n \quad (3)$$

The public operation on x can also be verification of the signature x, and then consist in computing:

$$y = x^e \text{ modulo } n \quad (2)$$

The corresponding private operation is then generation of a signature x on the basis of the previously encoded message y by applying a hash function or "padding" function $\mu$, and consists in computing:

$$Y^d \text{ modulo } n \quad (3)$$

Where $x=y^d$ modulo n since $e \cdot d = 1$ modulo $\Phi(n)$.

Another mode of operation known as the Chinese Remainder Theorem (CRT) mode is presented below. It is four times faster than the mode of operation of the standard RSA algorithm. In the CRT mode, the modulo n computations are not performed directly, but rather the modulo p and modulo q computations are performed first.

The public parameters are (n, e) but, in the CRT mode, the private parameters are (p, q, d) or (p, q, $d_p$, $d_q$, $i_q$), where $$d_p = d\ \mathrm{modulo}(p-1),\ d_q = d\ \mathrm{modulo}(q-1)$$

and $i_q = q^{-1}$ modulo p

By relationship (1), the following are obtained:

$$ed_p = 1\ \mathrm{modulo}(p-1)\ \text{and}\ ed_q = 1\ \mathrm{modulo}(q-1) \quad (4)$$

The public operation is performed in the same manner as for the standard operating mode. In contrast, for the private operation, the following are computed first:

$$x_p = y^{d_p}\ \text{modulo p and}\ x_q = y^{d_q}\ \text{modulo q}$$

Then, by applying the Chinese Remainder Theorem, $x = y^d$ modulo n is obtained by:

$$x = CRT(x_p, x_q) = x_q + q[i_q(x_p - x_q) \mathrm{modulo}\ p] \quad (5)$$

An important aspect of the field of public-key cryptography using the RSA encryption scheme thus consists in making implementation of the RSA algorithms secure against the various possible types of attack mentioned above, in particular side channel attacks such as DPA and SPA attacks, as well as "fault" attacks in which the attacker, by using any method, injects a fault during the computation of a private operation of the RSA algorithm with the aim of obtaining a corrupted value from which it is possible, in certain cases, to deduce certain items of secret data.

In the state of the art, certain countermeasure methods have been devised for parrying the various types of attack.

In particular, one possible countermeasure for parrying DPA (and SPA) type attacks against RSA in standard mode consists in making the private operation (signature or decryption) of the RSA random by inserting a random value into the computation.

Thus, one countermeasure method of that type consists in computing the private operation in standard mode (3) $x = y^d$ modulo n in the following manner:

$x = y^{d-r} \cdot y^r$ modulo n, where r is a random integer. However the drawback with that countermeasure method is that the computing time is doubled.

Another countermeasure method of that type for parrying DPA (and SPA) attacks against RSA in standard mode consists in computing the private operation (3) $x = y^d$ modulo n in the following manner:

$x = y^{(d+r \cdot \Phi(n))}$ modulo n, where r is a random integer. However the drawback with that countermeasure method is that it requires knowledge of the value of $\Phi(n)$, which is generally unknown to the cryptography algorithm that implements the private operation (signature or decryption).

A variant of that method has therefore been proposed, based not only on the knowledge of the value of $\Phi(n)$, but also on the knowledge of the public exponent e. (1) gives us: $e \cdot d = 1$ modulo $\Phi(n)$ and so an integer k exists such that: $e \cdot d - 1 = k \cdot \Phi(n)$.

Therefore, the expression $x = y^{(d+r \cdot \Phi(n))}$ modulo n can be computed in the following form:

$x = y^{(d+r \cdot (ed-1))}$ modulo n, where r is a random integer.

That countermeasure method is thus computationally equivalent to the method from which it follows, but it offers the advantage of not requiring knowledge of the value of $\Phi(n)$. It requires less memory in the sense that it does not require $\Phi(n)$ to be kept.

However, in order to be implemented, that variant countermeasure requires knowledge of the value of the public exponent e. Unfortunately, in many cryptography applications, the component or the device implementing the private operation of the RSA algorithm does not always have the public exponent e, in particular when it executes the private operation only. Therefore, in that context, the public exponent e is generally unknown or unavailable.

The above-described countermeasures are mainly intended for parrying attacks of the DPA type. However, they also make SPA-type attacks more difficult insofar as the execution of the algorithm is non-deterministic.

As regards the other above-mentioned type of attack, namely the "fault" attack, the best possible protection for parrying it consists in testing, in standard mode, whether the value x obtained by applying the private operation does indeed satisfy the relationship $x^e = y$ modulo n of the public operation. If it does not, the value y is not returned, so as to prevent it from being used for cryptanalysis purposes.

In CRT mode, the protection consists in checking firstly whether the relationships $x^e = y$ modulo p and $x^e = y$ modulo q are indeed satisfied.

When those relationships are satisfied, it is possible to be certain that no errors have occurred during the running of the private operation of the RSA algorithm.

However, a drawback preventing implementation of such checking against fault attacks in standard mode or in CRT mode is that those checking operations also require prior knowledge of the public exponent e. Unfortunately, as explained above, the component or the device implementing the private operation of the RSA algorithm in standard mode or in CRT mode does not always have the public exponent e, in particular when it executes the private operation only. In that context, the public exponent e is therefore generally unknown or unavailable.

To that end, Patent Document FR 2 830 146 (D1) proposes a method making it possible to perform certain steps of a cryptography algorithm, in particular of the RSA type in standard mode or in CRT mode, using a public exponent e that is not known a priori.

The method disclosed in D1 makes it possible, in particular, to provide a countermeasure, especially against fault attacks, that offers the best possible protection as mentioned above, even when the public exponent e is not known.

For that purpose, let (e, d) be a corresponding pair of RSA exponents that are respectively public and private, and let n be the RSA modulus. D1 starts from the following observation that, in 95% of cases, the value of the public exponent e is chosen from among the values $2^{16}+1$, 3, 17. The method of D1, explained briefly herein with reference to the standard mode but that can equally well be applied to the CRT mode, then consists in checking that e is indeed equal to one of said values by successively testing whether $e_i \cdot d = 1$ modulo $\Phi(n)$, where $e_i \, \Phi E = \{2^{16}+1, 3, 17\}$, until the relationship is satisfied.

When the relationship is satisfied for one $e_i$, then it is known that $e = e_i$. Once the value of the public exponent e has been determined in this way, e is stored with a view to being used in computations of the RSA algorithm aiming to check that no errors have occurred due to a fault attack during the running of a corresponding private operation of the RSA algorithm. Thus, knowing e, it is possible to assert with a probability equal to 1 that the private operation relating, for example, to generating a signature s, where $s = \mu(m)^d$ modulo n, where $\mu(m)$ is the value obtained by applying a padding function $\mu$ to the message m to be signed, has been performed without error merely by checking that the value s obtained satisfies the relationship $s^e = \mu(m)$ modulo n of the corresponding public operation.

If it has not been possible to attribute any value of $e_i$ to e, it then necessary, in D1, to note that the computations of the RSA algorithm using the value e for securing against fault attacks cannot be performed.

However, a drawback with the method proposed by D1 is that it requires a plurality of modular computations to be performed when successive testing is done to determine whether the relationship $e_i·d=1$ modulo $\Phi(n)$ is satisfied, for a value $e_i$ from among the $e_i$ values envisaged. That method is thus prohibitive in terms of computation time and of computation resources.

Thus, the problem that arises is to mitigate the above-mentioned drawbacks.

More particularly, an object of the present invention consists in determining, in a manner that is not prohibitive in terms of computation speed and complexity, the value of a public exponent e from among a set of predetermined probable values, when said value of e is known a priori, the exponent e being implemented in certain steps of an RSA-type cryptography algorithm in standard mode or in CRT mode.

Another object therefore consists in making it possible, once the value of the public exponent e has been determined, to implement countermeasure operations using the value of the public exponent e, aimed at parrying firstly "fault attacks" and secondly "side channel attacks", in particular of the DPA and SPA types, that might be made during implementation of a private operation of a cryptography algorithm, in particular an algorithm of the RSA type.

With a view to achieving these objects, the invention provides a method of securely implementing a public-key cryptography algorithm, the public key being composed of an integer n that is a product of two large prime numbers p and q, and of a public exponent e, said method consisting in determining a set E comprising a predetermined number of values $e_i$ that can correspond to the value of the public exponent e, the $e_i$ values being prime numbers, said method being characterized in that it comprises the following steps consisting in:

a) computing a value $$\Phi = \prod_{ei \in E} ei$$

such that $\Phi/e_i$ is less than $\Phi(n)$ for any $e_i$ belonging to E, where $\Phi$ is the Euler totient function;

b) applying the value $\Phi$ to a predetermined computation;

c) for each $e_i$, testing whether the result of said predetermined computation is equal to a value $\Phi/e_i$:

if so, then attributing the value $e_i$ to e, and storing e with a view to it being used in computations of said cryptography algorithm;

otherwise, observing that the computations of the cryptography algorithm using the value e cannot be performed.

The advantage is thus clearly that there is only one modular multiplication.

In a first variant, the cryptography algorithm is based on an RSA-type algorithm in standard mode.

With reference to said first variant, the predetermined computation of step b) consists in computing a value C:

$C=\Phi·d$ modulo $\Phi(n)$, where d is the corresponding private key of the RSA algorithm such that $e·d=1$ modulo $\Phi(n)$ and $\Phi$ is the Euler totient function.

In an alternative, the predetermined computation of step b) consists in computing a value C:

$C=\Phi·d$ modulo $\Phi(n)$, where d is the corresponding private key of the RSA algorithm such that $e·d=1$ modulo $\Phi(n)$, with $\Phi$ being the Carmichael function.

In a second variant, the cryptography algorithm is based on an RSA-type algorithm in CRT mode.

With reference to said second variant, the predetermined computation of step b) consists in computing a value C:

$C=\Phi·d_p$ modulo $(p-1)$, where $d_p$ is the corresponding private key of the RSA algorithm such that $e·d_p=1$ modulo $(p-1)$.

In an alternative, the predetermined computation of step b) consists in computing a value C:

$C=\Phi·d_q$ modulo $(q-1)$, where $d_q$ is the corresponding private key of the RSA algorithm such that $e·d_q=1$ modulo $(q-1)$.

In another alternative, the predetermined computation of step b) consists in computing two values $C_1$ and $C_2$ such that:

$C_1=\Phi·d_p$ modulo $(p-1)$, where $d_p$ is the corresponding private key of the RSA algorithm such that $e·d_p=1$ modulo $(p-1)$;

$C_2=\Phi·d_q$ modulo $(q-1)$, where $d_q$ is the corresponding private key of the RSA algorithm such that $e·d_q=1$ modulo $(q-1)$;

and in that the test step c) consists, for each $e_i$, in testing whether $C_1$ and/or $C_2$ is equal to the value $\Phi/e_i$:

if so, then attributing the value $e_i$ to e and storing e with a view to it being used in computations of said cryptography algorithm;

otherwise, observing that the computations of said cryptography algorithm using the value e cannot be performed.

In the first variant, and when a value $e_i$ has been attributed to e, the computations using the value e consist in:

choosing a random integer r;

computing a value $d^*$ such that $d^*=d+r·(e·d-1)$; and implementing a private operation of the algorithm in which a value x is obtained from a value y by applying the relationship $x=y^{d^*}$ modulo n.

In the first variant, and when a value $e_i$ has been attributed to e, the computations using the value e consist, after a private operation of the algorithm, in obtaining a value x from a value y and in checking whether $x^e=y$ modulo n.

In the second variant and when a value $e_i$ has been attributed to e, the computations using the value e consist, after a private operation of the algorithm, in obtaining a value x from a value y and in checking firstly whether $x^e=y$ modulo p and secondly whether $x^e=y$ modulo q.

Preferably, the set E comprises at least the following $e_i$ values: 3, 17, $2^{16}+1$.

The invention also provides an electronic component characterized in that it comprises means for implementing the method as defined above.

The invention also comprises a smart card including an electronic component as defined.

The invention also provides a method of securely implementing a public-key cryptography algorithm, the public key being composed of an integer n that is a product of two large prime numbers p and q, and of a public exponent e, said method consisting in determining a set E comprising a predetermined number of values $e_i$ that can correspond to the value of the public exponent e, the $e_i$ values being prime members, said method being characterized in that it comprises the following steps consisting in:

a) choosing a value $e_i$ from the values of the set E;

b) if $\Phi(p)=\Phi(q)$, testing whether the chosen $e_i$ value satisfies the relationship:

$$(1-e_i·d) \text{modulo } n < e_i·2^{(\Phi n)/2)+1}$$

or said relationship as simplified:

$$(-e_i·d) \text{modulo } n < e_i·2^{(\Phi(n)/2)+1}$$

where $\Phi(p)$, $\Phi(q)$, and $\Phi(n)$ are the functions giving the numbers of bits respectively encoding the number p, the number q, and the number n;

otherwise, when p and q are unbalanced, testing whether the chosen $e_i$ value satisfies the following relationship:

$$(1-e_i \cdot d) \text{modulo } n < e_i \cdot 2^{g+1}$$

or said relationship as simplified:

$$(-e_i \cdot d) \text{modulo } n < e_i \cdot 2^{g+1}$$

with g=max ($\Phi(p)$, $\Phi(q)$), if $\Phi(p)$ and $\Phi(q)$ are known, or, otherwise, with g=$\Phi(n)/2$+t, where t designates the imbalance factor or a limit on that factor;

c) if the test relationship applied in the preceding step is satisfied and so e=$e_i$, storing e with a view to using it in computations of said cryptography algorithm;

otherwise, reiterating the preceding steps while choosing another value for $e_i$ from the set E until an $e_i$ value can be attributed to e and, if no $e_i$ value can be attributed to e, then observing that the computations of said cryptography algorithm using the value of e cannot be performed.

The fact that the order of the $e_i$ values is chosen as the order of the probabilities of the public exponents appearing makes it possible to save time. Thus, it is possible preferably to choose the following order: $e_0=2^{16}+1$, $e_1=3$, $e_2=17$.

In a variant, for all values of i, $e_i \leq 2^{16}+1$, and the step b) is replaced by another test step consisting in:

if $\Phi(p)=\Phi(q)$, testing whether the chosen $e_i$ value satisfies the relationship:

$$(1-e_i \cdot d) \text{modulo } n < e_i \cdot 2^{(\Phi(n)/2)+17}$$

or said relationship as simplified:

$$(-e_i \cdot d) \text{modulo } n < e_i \cdot 2^{(\Phi(n)/2)+17}$$

where $\Phi(p)$, $\Phi(q)$, and $\Phi(n)$ are the functions giving the numbers of bits respectively encoding the number p, the number q, and the number n;

otherwise, when p and q are unbalanced, testing whether the chosen $e_i$ value satisfies the following relationship:

$$(1-e_i \cdot d) \text{modulo } n < e_i \cdot 2^{g+17}$$

or said relationship as simplified:

$$(-e_i \cdot d) \text{modulo } n < e_i \cdot 2^{g+17}$$

with g=max ($\Phi(p)$, $\Phi(q)$), if $\Phi(p)$ and $\Phi(q)$ are known, or, otherwise, with g=$\Phi(n)/2$+t, where t designates the imbalance factor or a limit on that factor.

In another variant, step b) is replaced with another test step consisting in:

testing whether the chosen $e_i$ value satisfies the relationship whereby:
the first most significant bits of $(1-e_i \cdot d)$ modulo n are zero;
or said relationship as simplified whereby:
the first most significant bits of $(-e_i \cdot d)$ modulo n are zero.

Preferably, the test is performed on the first 128 most significant bits.

In a preferred embodiment of the invention, the cryptography algorithm is based on an RSA-type algorithm in standard mode.

According to one characteristic, when an $e_i$ value has been attributed to e, the computations using the value e consist in:
choosing a random integer r;
computing a value d* such that d*=d+r·(e·d−1);
implementing a private operation of the algorithm in which a value x is obtained from a value y by applying the relationship x=$y^{d*}$ modulo n.

According to another characteristic, when an $e_i$ value has been attributed to e, the method of the invention consists, after a private operation of the algorithm, in obtaining a value x from a value y and the computations using the value e consist in checking whether $x_e$=y modulo n.

Preferably, the set E comprises at least the following $e_i$ values: 3, 17, $2^{16}+1$.

The invention also provides an electronic component characterized in that it comprises means for implementing the method as defined above.

The invention also provides a smart card including an electronic component as defined.

Other characteristics and advantages of the present invention appear more clearly from the following description given by way of non-limiting indication.

The present invention thus describes various techniques making it possible to validate the value of a public exponent e that is not known a priori. These techniques can be implemented by any electronic component or device equipped with suitable cryptographic computation means, and in particular by a smart card.

The invention is based on the following observation: let a set E comprise at least the following values of e: $e_0=2^{16}+1$; $e_1=3$; and $e_2=17$; this set E of values covers about 95% of the values of the public exponents commonly used in the computations of cryptography algorithms of the RSA type.

The first technique proposed by the present invention, valid for the standard mode of the RSA algorithm, then consists in general in choosing $e_0$ and in checking whether e=$e_0$; if e≠$e_0$, then an attempt is made with $e_1$; and if e≠$e_1$, then and attempt is made with $e_2$.

It is possible that, for a certain application corresponding to the 5% of other cases, e is equal neither to $e_0$, nor to $e_1$, nor to $e_2$. The value of e is thus more generally designated by $e_i$. And the method consists finally in choosing a value $e_i$ from among the $e_i$ values envisaged and in checking whether e=$e_1$.

More particularly, the first technique for finding the value of e, valid for the standard mode of the RSA algorithm, is based on the following reasoning:

In the standard mode, the private algorithm (implementing an operation for signing or for decrypting a message) has the value of the modulus n and of the private exponent d.

Thus, from the expression (1), it follows that there exists an integer k such that:

$$e \cdot d = 1 + k\Phi(n)$$

$$i \cdot e \cdot 1 - e \cdot d = -k\Phi(n) = -k \cdot (n - p - q + 1)$$

By reducing both sides of the expression modulo n, the following is obtained:

$$1 - e \cdot d = k(p + q - 1)(\text{modulo } n)$$

By noting that k<e is always obtained when e is relatively small, the preceding expression can also be written:

$$(1 - e \cdot d) \text{modulo } n = k(p + q - 1) \quad (6)$$

The left side of equation (6) has substantially the same size as the modulus n, while the right side has its size defined according to the following expression when p and q are balanced, i.e. of the same size $\Phi(p)=\Phi(q)$ $$k \cdot (p + q - 1) < e \cdot 2^{(\Phi(n)/2)+1}$$

where $\Phi(n)$, $\Phi(p)$, $\Phi(q)$ are the functions giving the numbers of bits encoding respectively the number n, the number p, and the number q.

When p and q are not of the same size, the function g=max ($\Phi(p),\Phi(q)$), i.e. the function giving the maximum of the lengths of p and q is called when $\Phi(p)$ and $\Phi(q)$ are known; otherwise, g=$\Phi(n)/2$+t is taken, where t designates the imbalance factor or, otherwise, a limit on that factor. When p and q are unbalanced, the formula of the above expression becomes:

$$k \cdot (p+q-1) < e \cdot 2^{1+g}$$

Since n=p·q, if p and q are balanced, then the expression $p+q < 2^{(\Phi(n)/2)+1}$ is obtained; conversely, if p and q are unbalanced, then: $p+q < 2^{1+g}$.

Thus, for all possible $e_i$ values in the set E, if $\Phi(p)=\Phi(q)$, a test is conducted to determine whether the chosen $e_i$ value satisfies the following predetermined relationship:

$$(1-e_i \cdot d) \text{modulo } n < e_i \cdot 2^{(\Phi(n)/2)+1} \quad (7)$$

otherwise a test is conducted to determine whether the chosen $e_i$ value satisfies the following predetermined relationship:

$$(1-e_i \cdot d) \text{modulo } n < e_i \cdot 2^{g+1} \quad (7')$$

if the predetermined test relationship applied is satisfied, then $e=e_i$ and e is stored;

otherwise, another value is chosen for $e_i$ from the set E and the preceding steps are reiterated.

In a first variant, the test for finding the value of e:

$$(1-e_i \cdot d) \text{modulo } n < e_i \cdot 2^{(\Phi(n)/2)+1} \text{ or}$$

$(1-e_i \cdot d) \text{modulo } n < e_i \cdot 2^{g+1}$, depending on whether or not p and q are balanced, can be replaced with the following test:

$$(1-e_i \cdot d) \text{modulo } n < B;$$

where $B \geq [\max(e_i)] 22^{(\Phi(n)/2)+1}$ when $\Phi(p)=\Phi(q)$ and $B \geq [\max(e_i)] 2^{g+1}$ otherwise.

In our example, $E=\{2^{16}+1, 3, 17\}$. Thus, for all values of i, $e_i \leq 2^{16}+1$ and the preceding test can thus be simplified in the following manner consisting in checking whether:

$$(1-e_i \cdot d) \text{modulo } n < B, \text{ where } B = 2^{(\Phi(n)/2)+17} \text{ when } \Phi(p) = \Phi(q);$$

and $(1-e_i \cdot d) \text{ modulo } n < B$, where $B=2^{g+17}$ otherwise.

In a second variant of the test, it is possible to simplify the preceding test further by checking whether the most significant bits, e.g. the 128 most significant bits, of $(1-e_i \cdot d) \text{ modulo } n$ are zero.

Finally, for the first technique, a final simplification consists in determining the predetermined relationship for the test on the values of $e_i$, starting with the following relationship:

$$(-e \cdot d) \text{modulo } n = k(p+q-1)-1$$

in place of relationship (6).

Thus, from this simplification, the following simplification is obtained for test relationships (7, 7'):

$$(-e_i \cdot d) \text{modulo } n < e_i 2^{(\Phi(n)/2)+1} \text{ if } \Phi(p) = \Phi(q);$$

and $(-e_i \cdot d) \text{ modulo } n \ e_i \cdot 2^{g+1}$ otherwise.

For the first variant, the following simplified test is obtained:

$$(-e_i \cdot d) \text{modulo } n < B, \text{ where } B = 2^{(\Phi(n)/2)+18} \text{ if } \Phi(p) = \Phi(q) \text{ and } B = 2^{g+17} \text{ otherwise}.$$

And, for the second variant of the test, the following simplified test is obtained consisting in checking whether the first most significant bits of $(-e_i \cdot d)$ modulo n are zero.

Regardless of the variant implemented, whether or not it is in its simplified version, if the test is not satisfied for a value of $e_i$, another value is chosen for $e_i$ from the set E until a match is found.

If, for either of the variants concerning the first technique described above, there does not exist among the $e_i$ values a value such that $e=e_i$, then it remains to observe that computations of the RSA cryptography algorithm in standard mode that involve e cannot be performed.

Conversely, when the value of e has been found among the values $e_i$ of the set of predetermined values E, by either of the variants, it is then possible to check each private operation (3) of the cryptography algorithm (consisting in decrypting a message or in generating a signature) by making sure that the value x obtained on the basis of a value y by applying the private operation satisfies the relationship $x^e = y$ modulo n. Otherwise, the decrypted message or the signature is not returned so as to avoid any cryptanalysis.

As explained above, once e is known, the method of the invention can also apply to a countermeasure, in particular against DPA (and SPA) type attacks, as described above. Such a method thus consists in: choosing a random integer r; computing a value d* such that $d^* = d + r \cdot (e \cdot d - 1)$; and implementing a private operation of the algorithm in which a value x is obtained from a value y by applying the relationship $x = y d^* $ modulo n.

Finally, the present invention relates to a second technique for finding the value of the exponent e from a set E comprising a set of predetermined values $e_i$. As explained below, this technique is applicable both for the standard mode of the RSA algorithm and for the CRT mode.

Said technique consists more particularly in improving the method proposed in D1. Thus, the following steps are implemented:

a) define a value $$\Phi = \prod_{ei \in E} ei$$

such that $\Phi/e_i$ is less than $\Phi(n)$ for any $e_i$ belonging to E, where $\Phi$ is the Euler totient function;

b) apply the value $\Phi$ to a predetermined computation;

c) for each $e_i$, test whether the result of said predetermined computation is equal to a value $\Phi/e_i$:

if so, then attribute the value $e_i$ to e, and store e with a view to it being used in computations of the cryptography algorithm;

otherwise, observe that the computations of the cryptography algorithm using the value e cannot be performed.

In standard mode, the predetermined computation of step b) consists in computing a value C such that:

$C = \Phi \cdot d$ modulo $\Phi(n)$, where d is the corresponding private key of the RSA algorithm in standard mode such that $e \cdot d = 1$ modulo $\Phi(n)$.

For example, let the set $E = \{e_0 = 3, e_1 = 17, e_2 = 2^{16}+1\}$, then $\Phi = e_0 \cdot e_1 \cdot e_2 = 3 \cdot 17 \cdot (2^{16}+1)$.

Thus, with $C = \Phi \cdot d$ modulo $\Phi(n)$:

If $C = 17 \cdot (2^{16}+1) = \Phi/e_0$ then $e = e_0 = 3$;

If $C = 3 \cdot (2^{16}+1) = \Phi/e_1$ then $e = e_1 = 17$;

If $C = 3 \cdot 17 = \Phi/e_2$ then $e = e_2 = (2^{16}+1)$;

By means of a single modular computation making it possible to obtain the value of C, it is thus possible to find the value of the exponent e from a set E, as a function of the results of said computation.

In an alternative, the predetermined computation of step b) consists in computing a value C such that:

$C = \Phi \cdot d$ modulo $\Phi(n)$, where d is the corresponding private key of the RSA algorithm in standard mode but computed in said alternative modulo the Carmichael function in place of modulo the Euler totient function, and thus such that: $e \cdot d = 1$ modulo $\Phi(n)$, with $\Phi$ being the Carmichael function.

When the value of e has been found and stored, the computations of the cryptography algorithm in standard mode implementing the value of e consist in parrying fault attacks and in putting place a countermeasure, in particular against DPA (and SPA) type attacks, and they are identical to the computations described with reference to the first technique.

In a variant, when the RSA algorithm implemented is in CRT mode, the predetermined computation of step b) consists in computing a value C such that:

$C = \Phi \cdot d_p$ modulo $(p-1)$, where $d_p$ is the corresponding private key of the RSA algorithm such that $e \cdot d_p = 1$ modulo $(p-1)$;

or indeed, such that:

$C = \Phi \cdot d_q$ modulo $(q-1)$, where $d_q$ is the corresponding private key of the RSA algorithm such that $e \cdot d_q = 1$ modulo $(q-1)$;

or indeed both of them, and in taking the e that is given by at least one of the two tests.

When the value of e has indeed been found and stored, the computations of the cryptography algorithm in CRT mode implementing the value of e consist in parrying fault attacks.

It is then possible to check each private operation in CRT mode of the cryptography algorithm (consisting in decrypting a message or in generating a signature) by making sure that the value x obtained from a value y by application of the private operation in CRT mode satisfies firstly the relationship $x^e = y$ modulo p and secondly the relationship $x^e = y$ modulo q.

The invention claimed is:

1. A method of securely implementing a public-key cryptography algorithm in a microprocessor-based system, the public key being composed of an integer n that is a product of two large prime numbers p and q, and of a public exponent e, said method determining a set E comprising a predetermined number of prime numbers $e_i$ that can correspond to the value of the public exponent e, and comprising the following steps:

a) choosing a value $e_i$ from the values of the set E;

b) if $\Phi(p) = \Phi(q)$, where $\Phi(n)$, $\Phi(p)$, and $\Phi(q)$ are functions giving the number of bits encoding respectively the number n, the number p, and the number q, testing, in a processor of the microprocessor-based system, whether the chosen $e_i$ value satisfies the relationship:

$$(1 - e_i \cdot d) \text{ modulo } n < e_i \cdot 2^{(\Phi(n)/2)+1}$$

or said relationship as simplified:

$$(-e_i \cdot d) \text{ modulo } n < e_i \cdot 2^{(\Phi(n)/2)+1}$$

c) if the test relationship applied in the preceding step is satisfied, defining $e = e_i$, and storing e in a memory of the microprocessor-based system;

otherwise, reiterating the preceding steps while choosing another value for $e_i$ from the set E until an $e_i$ value can be attributed to e and, if no $e_i$ value can be attributed to e, then indicating that the computations of said cryptography algorithm using the value of e cannot be performed; and d) performing a cryptographic operation on data using the stored value for e.

2. The method of securely implementing a public-key cryptography algorithm according to claim 1, wherein step b is performed in the following manner when $\Phi(p) \neq \Phi(q)$, i.e. when p and q are unbalanced, testing whether the chosen $e_i$ value satisfies the following relationship:

$$(1 - e_i \cdot d) \text{ modulo } n < e_i \cdot 2^{g+1}$$

or said relationship as simplified:

$$(-e_i \cdot d) \text{ modulo } n < e_i \cdot 2^{g+1}$$

with $g = \max \Phi(p), \Phi(q))$, if $\Phi(p)$ and $\Phi(q)$ are known, or, otherwise, with $g = \Phi(n)/2 + t$, where t designates the imbalance factor or a limit on that factor.

3. The method according to claim 2, wherein, for all values of i, $e_i \leq 2^{16}+1$, step b) is replaced by another test step comprising:

b) if $\Phi(p) = \Phi(q)$, testing whether the chosen $e_i$ value satisfies the relationship:

$$(1 - e_i \cdot d) \text{ modulo } n < e_i \cdot 2^{(\Phi(n)/2)+17}$$

or said relationship as simplified:

$$(-e_i \cdot d) \text{ modulo } n < e_i \cdot 2^{(\Phi(n)/2)+17}$$

where $\Phi(p)$, $\Phi(q)$, and $\Phi(n)$ are functions giving the numbers of bits respectively encoding the number p, the number q, and the number n;

otherwise, when p and q are unbalanced, testing whether the chosen $e_i$ value satisfies the following relationship:

$$(1 - e_i \cdot d) \text{ modulo } n < e_i \cdot 2^{g+17}$$

or said relationship as simplified:

$$(-e_i \cdot d) \text{ modulo } n < e_i \cdot 2^{g+17}$$

with $g = \max \Phi(p), \Phi(q))$, if $\Phi(p)$ and $\Phi(q)$ are known, or, otherwise, with $g = \Phi(n)/2 + t$, where t designates the imbalance factor or a limit on that factor.

4. The method according to claim 2, wherein step b) is replaced with another test step comprising:

testing whether the chosen $e_i$ value satisfies the relationship whereby:

a predetermined number of the first most significant bits of $(1 - e_i \cdot d)$ modulo n are zero;

or said relationship as simplified whereby:

said predetermined number of the first most significant bits of $(-e_i \cdot d)$ modulo n are zero.

5. The method according to claim 4, wherein the test is performed on the first 128 most significant bits.

6. The method according to claim 1, wherein the cryptography algorithm is based on an RSA-type algorithm in standard mode.

7. The method according to claim 1 wherein, when an $e_i$ value has been attributed to e, the computations using the value e comprise:

choosing a random integer r;

computing a value d* such that $d^* = d + r \cdot (e \cdot d - 1)$;

implementing a private operation of the algorithm in which a value x is obtained from a value y by applying the relationship $x = y^{d*}$ modulo n.

8. The method according to claim 1 wherein, when an $e_i$ value has been attributed to e, after a private operation of the algorithm, a value x is obtained from a value y and the computations using the value e comprise checking whether $x_e = y$ modulo n.

9. The method according to claim 1, wherein the set E comprises at least the following $e_i$ values: 3, 17, $2^{16}+1$.

10. The method according to claim 9, wherein the preferred choice of the values $e_i$ from the values of the set E is made in the following order: $2^{16}+1$, 3, 17.

11. The method according to claim 1, wherein, for all values of i, $e_i \leq 2^{16}+1$, step b) is replaced by another test step comprising:

b) if $\Phi(p) = \Phi(q)$, testing whether the chosen $e_i$ value satisfies the relationship:

$$(1 - e_i \cdot d) \text{ modulo } n < e_i \cdot 2^{(\Phi(n)/2)+17}$$

or said relationship as simplified:

$$(-e_i \cdot d) \text{ modulo } n < e_i \cdot 2^{(\Phi(n)/2)+17}$$

where $\Phi(p)$, $\Phi(q)$, and $\Phi(n)$ are functions giving the numbers of bits respectively encoding the number p, the number q, and the number n;

otherwise, when p and q are unbalanced, testing whether the chosen $e_i$ value satisfies the following relationship:

$$(1-e_i \cdot d) \text{modulo } n < e_i \cdot 2^{g+17}$$

or said relationship as simplified:

$$(-e_i \cdot d) \text{modulo } n < e_i \cdot 2^{g+17}$$

with g=max $\Phi(p)$, $\Phi(q)$), if $\Phi(p)$ and $\Phi(q)$ are known, or, otherwise, with g=$\Phi(n)/2$+t, where t designates the imbalance factor or a limit on that factor.

12. The method according to claim 1, wherein step b) is replaced with another test step comprising:

testing whether the chosen $e_i$ value satisfies the relationship whereby:

a predetermined number of the first most significant bits of $(1-e_i \cdot d)$ modulo n are zero;

or said relationship as simplified whereby:

said predetermined number of the first most significant bits of $(-e_i \cdot d)$ modulo n are zero.

13. The method according to claim 1, wherein said cryptographic operation comprises at least one of encrypting data, decrypting data, signing a message and authenticating a message.

14. An electronic component comprising a processor that is configured to execute the following steps:

a) choosing a value $e_i$ from the values of the set E;

b) if $\Phi(p)=\Phi(q)$, where $\Phi(n)$, $\Phi(p)$, and $\Phi(q)$ are functions giving the number of bits encoding respectively the number n, the number p, and the number q, where n is an integer that is a product of two large prime numbers p and q, testing, in the processor of the electronic component, whether the chosen $e_i$ value satisfies the relationship:

$$(1-e_i \cdot d) \text{modulo } n < e_i \cdot 2^{(\Phi(n)/2)+1}$$

or said relationship as simplified:

$$(-e_i \cdot d) \text{modulo } n < e_i \cdot 2^{(\Phi(n)/2)+1}$$

c) if the test relationship applied in the preceding step is satisfied, defining e=$e_i$, and storing e in a memory of the electronic component;

otherwise, reiterating the preceding steps while choosing another value for $e_i$ from the set E until an $e_i$ value can be attributed to e and, if no $e_i$ value can be attributed to e, then indicating that the computations of said cryptography algorithm using the value of e cannot be performed; and d) performing a cryptographic operation on data using the stored value for e.

15. A smart card including the electronic component of claim 14.

* * * * *

UNITED STATES PATENT AND TRADEMARK OFFICE
CERTIFICATE OF CORRECTION

PATENT NO. : 7,860,242 B2  
APPLICATION NO. : 12/071571  
DATED : December 28, 2010  
INVENTOR(S) : Karine Villegas Page 1 of 1

It is certified that error appears in the above-identified patent and that said Letters Patent is hereby corrected as shown below:

Title Page, column 1, item (62) after "7,359,508" add --which is a 371 of PCT/EP2004/051411 filed on July 8, 2004--.

Signed and Sealed this
Thirteenth Day of August, 2013

Teresa Stanek Rea
*Acting Director of the United States Patent and Trademark Office*